United States Patent [19]
Green

[11] 3,857,093
[45] Dec. 24, 1974

[54] VEHICLE LOAD MEASURING USING A SHOCK ABSORBER AND VARIABLE RESISTOR

[76] Inventor: Donald R. Green, 3838 N.E. 44th Dr., Des Moines, Iowa 50317

[22] Filed: Aug. 17, 1973

[21] Appl. No.: 389,390

[52] U.S. Cl.................. 324/65 R, 177/137, 324/71
[51] Int. Cl............................................ G01r 27/02
[58] Field of Search............ 324/65 R, 71; 338/183; 177/137

[56] References Cited
UNITED STATES PATENTS

| | | | |
|---|---|---|---|
| 1,407,078 | 2/1922 | Murray | 177/137 |
| 3,109,505 | 11/1963 | Davis et al. | 177/137 |
| 3,362,004 | 1/1968 | Bang | 338/183 |

*Primary Examiner*—Stanley T. Krawczewicz
*Attorney, Agent, or Firm*—Zarley, McKee, Thomte & Voorhees

[57] ABSTRACT

The present invention comprises a method and means for measuring the load applied to a given axle of a vehicle, the vehicle having a frame and spring means yieldably supporting the frame with respect to the axle. The device comprises an elongated upper member attached to the frame and an elongated lower member attached to the axle. The upper and lower members are telescopically mounted with respect to one another for telescopic movement therebetween. A variable resistor is mounted to the upper and lower members for sensing the relative movement therebetween, and a gauge is associated with the resistor for visibly registering a plurality of readings corresponding to the various positions of the upper and lower members with respect to one another. The method of the present invention comprises attaching the opposite ends of a shock absorber to the frame and axle respectively, and measuring the amount of telescopic displacement of the shock absorber in response to various loads on the frame.

7 Claims, 5 Drawing Figures

PATENTED DEC 24 1974 3,857,093
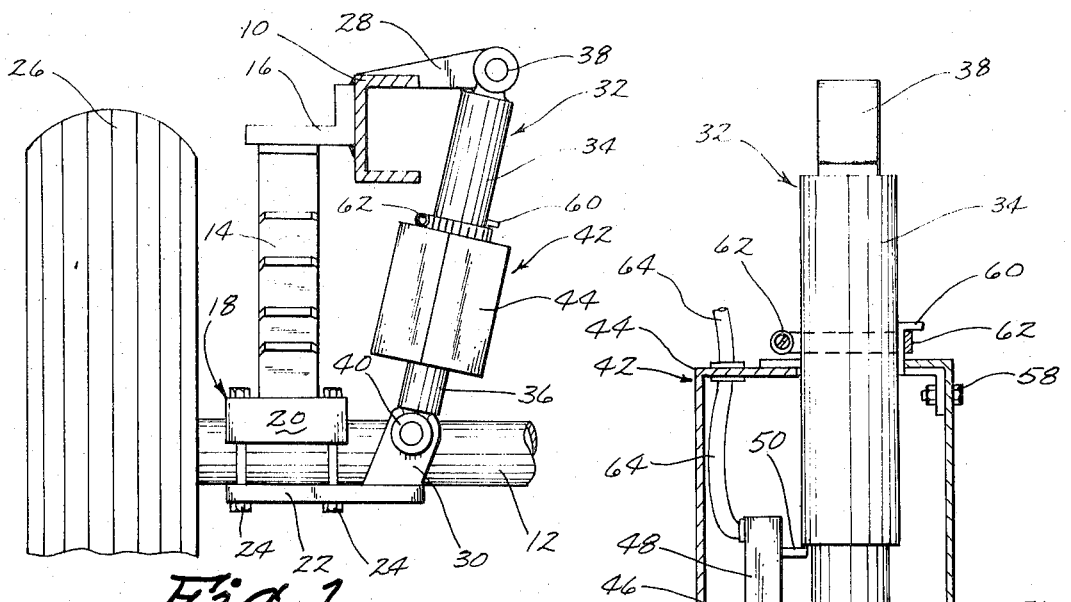
Fig. 1
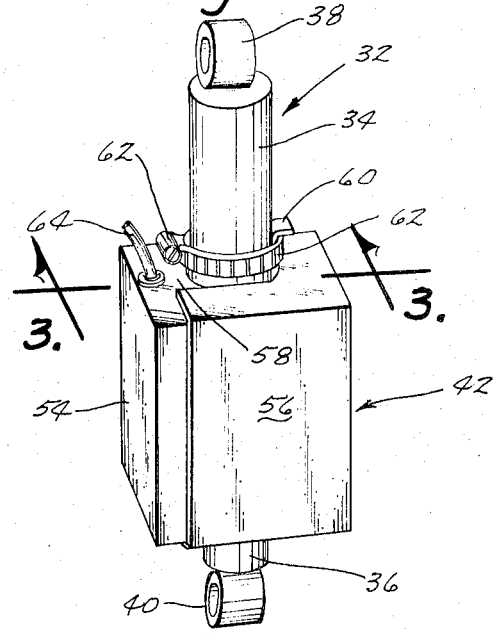
Fig. 2
Fig. 3
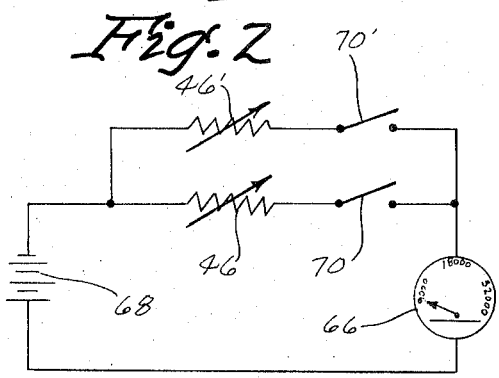
Fig. 4
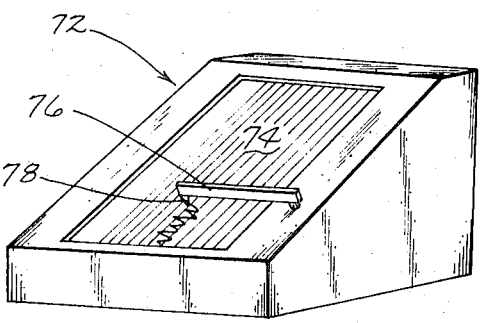
Fig. 5

VEHICLE LOAD MEASURING USING A SHOCK ABSORBER AND VARIABLE RESISTOR

The present invention relates to method and means for measuring the load applied to an axle of a vehicle.

One problem encountered with many over-the-road vehicles is the ability to determine the exact load which is being carried by each of the axles of the vehicle. Government officials need a fast easy way to measure this load, and the owners of the various vehicles also need a quick easy means to determine whether or not their vehicle is in compliance with government regulations. Large scales are often used to measure these loads, but these scales are highly expensive and complicated in structure. Nearly all vehicles have the frame spring mounted to the axle, and therefore an attempt has been made in prior art devices to measure the displacement of the frame with respect to the axle in response to various loads being applied to the frame. Measurement of this displacement makes possible the determination of the particular load being applied to the axle involved. Previous prior art devices utilized complicated electro mechanical devices which must be connected both to the frame and to the axle and which are easily damaged or broken by exposure to the elements.

The present invention simplifies prior art devices by measuring the collapsible displacement of a conventional shock absorber in response to various loads being applied to a vehicle. The present invention utilizes a variable resistor in engagement with the two moving parts of a shock absorber for measuring this displacement. The resistor can be applied to existing shock absorbers on the vehicle, or if no shock absorbers are presently on the vehicle, they may be added and the resistor applied thereto. The shock absorber is highly sturdy and is structurally sound even when exposed to the various forces and elements caused by movement of the vehicle.

Therefore a primary object of the present invention is the provision of method and means for measuring the load applied to an axle of a vehicle.

A further object of the present invention is the provision of a device which may be applied to a shock absorber for measuring the load applied to an axle of a vehicle.

A further object of the present invention is the provision of a device which is extremely simple in construction and which may be easily applied to presently existing vehicles.

A further object of the present invention is the provision of a device which will minimize the possibility of damage or impairment during motion and bouncing of the vehicle.

A further object of the present invention is the provision of a device which will be protected from the elements during use of the vehicle.

A further object of the present invention is the provision of a device which is extremely accurate in the measurement of the load applied to an axle of a vehicle.

A further object of the present invention is the provision of a device which is economical to manufacture, durable in use, and simple in construction.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a partial view of a vehicle showing the device of the present invention mounted on the shock absorber of the vehicle.

FIG. 2 is a perspective view of a shock absorber having the present invention mounted thereon.

FIG. 3 is a sectional view taken along line 3 — 3 of FIG. 2.

FIG. 4 is a schematic diagram of the electrical circuitry of the present invention.

FIG. 5 is a perspective view of a graphing device for recording the changes in load on a given axle during a particular period of time.

Referring to the drawings, a vehicle frame 10 is supported above a vehicle axle 12 by means of a conventional spring 14. Spring 14 is rigidly mounted to frame 10 by means of a bracket 16 which is welded or otherwise secured to frame 10. The lower end of spring 14 is mounted to axle 12 by means of a lower bracket 18 having an upper member 20 and a lower member 22 held together by bolts 24. A wheel 26 is rotatably mounted on the outer end of axle 12 in conventional fashion.

An upper ear bracket 28 is rigidly attached to frame 10 and is adapted to receive the upper end of a conventional shock absorber. Similarly, a lower ear bracket 30 is mounted to lower member 22 of lower bracket 18 and is adapted to receive the lower end of a conventional shock absorber. A conventional shock absorber 32 comprises an upper tubular member 34 and a lower tubular member 36. Upper tubular member 34 includes a collar 38 and lower tubular member 36 includes a collar member 40 both of which are adapted to be pivotally mounted on upper and lower ear brackets 28, 30, respectively. The particular structure of shock absorber 32 is well known in the art and will not be described in further detail herein. Conventional shock absorbers such as the ones shown in the drawings are adapted to receive and dampen the bouncing motion of frame 10 with respect to axle 12. This is done by virtue of the telescopic collapsing and extension of members 34, 36 with respect to one another.

A load-measuring device 42 is shown in the drawings to be mounted to shock absorber 32. Load-measuring device 42 comprises a housing 44 and a variable resistor 46 mounted within housing 44. Variable resistor 46 is shown in the drawings to be of the general type described in U.S. Pat. No. 3,362,004, but it could equally as well be any type of variable resistance device such as a potentiometer, a rheostat, or any other type of variable resistance device. Resistor 46 includes a body 48 and a wiper member 50 which is slidably mounted for longitudinal movement within body member 48. While a resistor having a longitudinal movable wiper member 50 is shown in the drawings, other types of variable resistors including those having circular or other types of movements, are equally adaptable to the present invention. The primary requisite of resistor 46 is that it be movable to a plurality of positions so as to change the resistance thereof. A clamping band 52 clamps body 48 to lower tubular member 36 of shock absorber 32.

Wiper member 50 engages the lower peripheral edge of upper tubular member 34 so as to be moved downwardly whenever upper tubular member 34 moves downwardly with respect to lower tubular member 36. While wiper member 50 is shown to be merely engaging upper tubular member 34, it could equally as well be attached to upper tubular member 34 so as to move in both directions in unison therewith. If wiper member 50 is not attached to upper tubular member 34, a spring means (not shown) must be provided within variable resistor 46 for biasing wiper member 50 upwardly, thereby causing wiper member 50 to move upwardly whenever upper tubular member 34 moves upwardly.

Housing 44 comprises two open-faced box members 54, 56 which are telescopically received within one another to form a box. The upper and lower ends of box members 54, 56 are provided with U-shaped openings 58 (FIG. 2) therein which slidably embrace shock absorber 32, but which permit variable resistor 46 to be enclosed within housing 42 and thus be protected from the elements. Box members 54, 56 are secured together by virtue of bolts or screws 58. An upstanding ear 60 extends upwardly from housing 44 and is surrounded by a clamp band 62 so as to secure housing 44 to upper tubular member 34. Lower tubular member 36 is permitted to slide upwardly and downwardly with respect to housing 44 by virtue of the opening which U-shaped openings 58 provide in the upper and lower ends of housing 44. A lead cable 64 extends from resistor 46 outwardly through housing 44, and is adapted to connect resistor 46 in a circuit with a voltmeter 66 and a power source 68. A switch 70 is provided in the circuit for actuating and deactuating voltmeter 66. Voltmeter 66 may be mounted within the cab of the vehicle or may be mounted at any convenient spot for viewing. Furthermore, the circuit in FIG. 4 also shows a second variable resistor 46' connected in series with a switch 70'. This second variable resistor may be mounted on a second shock absorber (not shown) which may be mounted to a second axle of the vehicle. Thus by closing switch 70 one can measure the load which is on one of the axles of the vehicle and by closing switch 70' one can determine what the load is on the other axle. There may be as many shock absorbers and variable resistors included in the circuit as there are axles on the vehicle. Each shock absorber and variable resistor produce a reading for each respective axle.

Referring to FIG. 5, a modified form of indicator is shown and is generally designated by the numeral 72. Indicator 72 may be used in the place of voltmeter 66, and is adapted to be connected in the circuit in the same fashion as voltmeter 66. Indicator 72 is a graphing device having a movable band of graph paper 74 and a marking arm 76 having a stylist 78 on the end thereof. Arm 76 is adapted to be actuated in much the same fashion as the dial on voltmeter 66 to cause stylist 78 to mark the various readings on graph paper 74 as graph paper 74 moves beneath stylist 78. The functioning of indicator 72 is known in the art and therefore the specific structure and manner of operation are not disclosed herein.

In operation switches 70 and 70' are normally open when voltmeter 66 is used in the circuit. When indicator 72 is used, switches 70 and 70' are closed at all times. Closing of switches 70 or 70' causes voltmeter 66 to register the voltage across variable resistor 46. The reading on voltmeter 66 will correspond to the particular resistance of resistor 46, and therefore will reflect the relative position of upper member 50 and body 48 of resistor 46. Likewise, this reading will also reflect the relative position of upper tubular member 34 with respect to lower tubular member 36. For example, if a 1000 pound weight is added to the frame, upper tubular member 34 will move downwardly with respect to lower tubular member 36. This will cause wiper member 50 of resistor 46 to move downwardly also, and a corresponding change in the reading on voltmeter 66 will result. Thus by calibrating voltmeter 66 with figures which correspond to various weights on frame 10, one can quickly determine the weight on axle 12 merely by looking at the dial of voltmeter 66. Of course, devices other than voltmeters may be used in the circuit merely by rearranging the circuit. For example, ammeters or ohmmeters may be used.

Thus the particular invention permits the measuring of the weight applied to axle 12 merely by determining the telesopic displacement of shock absorber 32 in response to the weight being applied to frame 10. The device of the present invention may be mounted upon any vehicle having shock absorbers already thereon. In such a case it would merely be necessary to attach resistor 46 to the shock absorber in the manner shown in FIG. 3 and to secure housing 44 therearound. If no shock absorbers are provided on the vehicle, the shock absorber may be first mounted thereon and then the resistor mounted on the shock absorber as referred to above. Thus it can be seen that the device may be quickly and easily mounted on any vehicle at a minimum of expense in labor and materials. In view of the foregoing it can be seen that the device accomplishes at least all of its stated objectives.

I claim:

1. A device for measuring the load applied to a given axle of a vehicle, said vehicle having a frame and spring means yieldably supporting said frame with respect to said axle, said device comprising in combination, a shock absorber having an elongated upper member having means for attachment thereof to said frame, an elongated lower member having means thereon for attachment of said lower member to said axle, means for movably connecting said upper and lower members whereby movement of said frame with respect to said axle causes said upper and lower members to move, a variable resistor adjustably attached to said lower member, said resistor having a vertically movable sensor thereon for varying the resistance of said resistor, said sensor being responsive to relative movement of said upper member of said shock absorber with respect to said lower member of said shock absorber, and a gauge associated with said resistor for registering the variance in resistance as said sensor moves responsive to movement of said upper and lower shock absorber members.

2. The device of claim 1 wherein said variable resistor is adjustably and rigidly attached to said lower member of said shock absorber.

3. The device of claim 1 wherein said sensor engages said upper member of said shock absorber.

4. The device of claim 1 wherein said gauge is a meter electrically connected to said variable resistor for registering the variance in resistance of said resistor as said sensor moves responsive to relative movement of said upper member of said shock absorber with respect to said lower member of said shock absorber.

5. The device of claim 1 wherein said meter includes graphing means thereon for graphing the resistance changes of said resistor over a period of time.

6. The device of claim 1 wherein a protective casing surrounds said variable resistor and is attached to said shock absorber.

7. A method for measuring the load applied to a given axle of a vehicle, said method comprising,
attaching the opposite telescopically collapsible ends of a shock absorber to the frame and axle respectfully of said vehicle;
placing two moving parts of a variable resistor in movable engagement with said opposite telescopically collapsible ends of said shock absorber,
each of said movable parts being responsive to movement of one of said telescopic ends of said shock absorber, sensing the amount of telescopic displacement of said shock absorber in response to various loads on said frame by measuring the changes in resistance of said resistor, and
placing meter means in an electrical circuit with said resistor, said meter means reflecting changes in resistance as said variable resistor is moved, said meter means being calibrated to provide weight indications for the load applied to said axle.

* * * * *